US006352586B1

(12) United States Patent
Lassmann

(10) Patent No.: US 6,352,586 B1
(45) Date of Patent: Mar. 5, 2002

(54) WATER-DILUTABLE COATING COMPOSITIONS

(75) Inventor: Walter Lassmann, Münster (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/446,694

(22) PCT Filed: Jul. 6, 1998

(86) PCT No.: PCT/EP98/04163

§ 371 Date: Dec. 22, 1999

§ 102(e) Date: Dec. 22, 1999

(87) PCT Pub. No.: WO99/02613

PCT Pub. Date: Jan. 21, 1999

(30) Foreign Application Priority Data

Jul. 5, 1997 (DE) .......................................... 197 28 856

(51) Int. Cl.$^7$ .............................. C09D 5/38; C09D 5/02
(52) U.S. Cl. ...................... 106/403; 106/447; 106/456; 106/459; 106/460; 106/493; 106/499; 106/504
(58) Field of Search .................................. 106/403, 404, 106/401, 447, 456, 459, 460, 493, 499, 504

(56) References Cited

U.S. PATENT DOCUMENTS 4,725,317 A * 2/1988 Wheeler ..................... 106/290

FOREIGN PATENT DOCUMENTS

| CH | 409 202 | 4/1961 | ............ C09D/5/10 |
| EP | 0 038 127 A1 | 3/1981 | ............ B05D/7/26 |
| EP | 0 393 579 A1 | 4/1990 | ............ C09D/5/38 |
| EP | WO 98/17731 | 4/1998 | ............ C09C/1/62 |
| GB | 2 053 258 A | 5/1980 | ............ C09C/1/62 |

* cited by examiner

*Primary Examiner*—Anthony Green

(57) ABSTRACT

The present invention relates to a water-thinnable coating composition comprising binders, inorganic pigments, and, if desired, organic pigments and also further customary additives such as solvents, fillers, plasticizers, stabilizers, wetting agents, dispersing auxiliaries, levelling agents, defoamers, catalysts and also further additives, individually or in a mixture with one another, and comprises at least one phosphoric ester and at least one fatty alcohol alkoxylate.

13 Claims, No Drawings

WATER-DILUTABLE COATING COMPOSITIONS

The invention relates to water-dilutable coating compositions comprising binders, aluminum pigment, and an aqueous diluent.

Water-thinnable coating compositions comprising binders, aluminum pigment and an aqueous diluent are known and are intended for use in particular in the finishing of automobiles, for producing metallic coating systems.

Metallic coating systems are nowadays applied preferably by the so-called basecoat/clearcoat technique, in which a basecoat pigmented with aluminum pigments is applied first and then coated over with a clearcoat.

A particular problem of aqueous coating compositions for producing metallic coating systems is that they often have a pH which is so high that the aluminum pigments used react with water, forming hydrogen. This phenomenon results in a range of problems, especially when the coating materials are stored in closed containers.

A range of processes have been disclosed by means of which aluminum pigments are to be passivated in such a way (cf. e.g. EP-A-0581235) that no hydrogen at all, or only a very small amount, is evolved. All of these processes, however, have the disadvantage that the gassing stability is still not satisfactory. With the use of known aluminum pigments passivated by chromation, it is necessary to accept impairments in the shade and metallic effect (flop) of the metallic coating systems.

The object on which the present invention is based is to provide a water-dilutable coating composition comprising binders, inorganic and, if desired, organic pigments and also further customary additives such as solvents, fillers, plasticizers, stabilizers, wetting agents, dispersing auxiliaries, levelling agents, defoamers, catalysts and further additives, individually or in a mixture with one another, which do not have the aforementioned disadvantages of the prior art.

This object is achieved in accordance with the invention by said coating composition comprising at least one phosphoric ester and at least one fatty alcohol alkoxylate.

The water-dilutable coating compositions of the invention can in principle comprise all binders suitable for water-dilutable coating compositions.

Binders which can be used include, accordingly, both refined natural products, examples being products of rosin and oils or cellulose nitrates, and resins whose composition is entirely synthetic. The latter includes phenolic resins, amine resins (e.g., urea resins, melamine resins), alkyd resins, polyvinyl acetates, epoxy resins, polyurethane resins, polyester resins, rosin-modified phenolic resins, chlorinated rubbers, chlorinated polypropylene, cyclorubbers, ketone resins, and acrylate resins.

Binders used in particular are water-dilutable or water-dispersible polyurethane resins, polyacrylate resins, polyester resins and amino resins, which can be prepared in organic solution, and also mixtures thereof.

The polyurethane resins which can be used as binders are known in principle. Suitable examples are the polyurethane resins described in the literature for use in water-based coating materials, provided these polyurethane resins—in a modification of the preparation described in the respective literature—can be prepared in the form of organic solutions.

Examples of suitable polyurethane resins are the resins described in the following documents: EP-A-355433, DE-A 3545618, DE-A 3813866, and the as yet unpublished German Patent Application DE 4005961.8. For further details of the preparation of the polyurethane resins and examples of suitable compounds, therefore, reference may be made to these documents.

The polyacrylate resins used as binders are likewise known and are described, for example, in DE-A 3832826. Suitable resins are general water-thinnable or water-dispersible polyacrylate resins which can be prepared in the form of organic solutions.

Also suitable as binders are water-dilutable or water-dispersible polyester resins which can be prepared in the form of organic solutions. Use is made, for example, of corresponding commercially customary water-dilutable or water-dispersible polyester resins, and also the polyester resins commonly used in water-based coating materials.

Further suitable binders include water-dilutable or water-dispersible amino resins. Preference is given to the use of water-dilutable melamine resins. These are, generally, etherified melamine formaldehyde condensates.

Apart from the degree of condensation, which should be as low as possible, the water-solubility of the amino resins depends on the etherifying component, with only the lowest members of the alcohol or ethylene glycol monoether series giving water-soluble condensates. The greatest importance is possessed by the methanol-etherified melamine resins. With the use of solubilizers, butanol-etherified melamine resins can also be dispersed in an aqueous phase. A further possibility is to insert carboxyl groups into the condensate. Transetherification products of highly etherified formaldehyde condensates with oxycarboxylic acids are soluble in water following neutralization, by way of their carboxyl groups, and may be present in the base paints.

As binders it is of course also possible to use mixtures of the aforementioned binders and, in addition or alone, other water-dilutable or water-dispersible binders.

The coating compositions of the invention can comprise customary additives such as solvents, plasticizers, stabilizers, wetting agents, rheological auxiliaries, dispersing auxiliaries, levelling agents, defoamers and catalysts, and also additives individually or in a mixture in the customary amounts. These substances can be added to the individual components and/or to the mixture as a whole.

The coating compositions of the invention can comprise, besides water, the customary solvents, examples being aliphatic or aromatic hydrocarbons, mono- or polyhydric alcohols, ethers, ethers, glycol ethers and esters thereof, and ketones, such as for example, toluene, xylene, butanol, ethyl glycol or butyl glycol (=ethylene glycol monoethyl or monobutyl ether) and acetates thereof, butyldiglycol (ethylene glycol dibutyl ether), ethylene glycol dimethyl ether, diethylene glycol dimethyl ether, cyclohexanone, methyl ethyl ketone, acetone, isophorone, or mixtures thereof.

Further components which may be added to the basecoats of the invention include crosslinked polymeric microparticles, as are disclosed, for example in EP-A-38 127, and/or customary organic or inorganic additives. For instance, examples of effective thickeners are sheet silicates, water-soluble cellulose ethers, such as hydroxyethyl cellulose, methyl cellulose or carboxymethyl cellulose, and also synthetic polymers having ionic and/or associative groups, such as polyvinyl alcohol, poly(meth)acrylic acid, polyvinyl pyrrolidone, styrene maleic anhydride or ethylene maleic anhydride copolymers and their derivatives, or else hydrophobically modified ethoxylated piperidine and triethanolamine. Particular preference is given to the use of tertiary amines as neutralizing agents, especially dimethylethanolamine, triethylamine, tripropylamine and tributylamine.

The basecoat compositions of the invention can comprise all of the dyes or pigments which are known and are customary in the coatings industry.

Examples of dyes and pigments, which can be organic or inorganic in nature, are titanium dioxide, graphite, carbon black, zinc chromate, strontium chromate, barium chromate, lead chromate, lead cyanamide, lead silicochromate, zinc oxide, cadmium sulfide, chromium oxide, zinc sulfide, nickel titanium yellow, chromium titanium yellow, iron oxide red, iron oxide black, ultramarine blue, phthalocyanine complexes, naphthol red, quinacridones, halogenated thioindigo pigments or the like.

Particularly preferred pigments are metal powders, individually or in a mixture, such as copper, copper alloys, aluminum and steel, preferably aluminum powders, which are used in at least predominant proportion and, specifically, in an amount of from 0.5 to 25% by weight based on the overall solids content of the binders in the coating compositions. Also suitable are customary commercial pearl lustre pigments. It is also possible to conceive of the use of combinations with transparent metal oxide, e.g. iron oxide red, titanium dioxide. Metallic pigments used are commercially customary untreated metal powders and also those which have been specially pretreated for aqueous systems.

The metal powders can also be used together with one or more of the abovementioned nonmetallic pigments or dyes. In this case the proportion thereof is chosen such that the desired metallic effect is not suppressed.

Furthermore, the coating composition of the invention comprises esters of phosphoric acid with alcohols or phenols. Aryl esters, alkyl esters and mixed phosphoric esters are used, as are phosphoric acid derivatives. Examples of suitable phosphoric acid derivatives are known from EP-A-0581235.

It has now been found that the stabilisation of metal pigments, especially aluminum pigments, can be further substantially improved, and thus that it is possible to obtain a long-term protective effect for the metal pigments in aqueous and nonaqueous coating formulations, even under extreme conditions, if the phosphoric esters are used in a mixture with fatty alcohol alkoxylates. In particular, the gassing stability is increased by means of this measure.

Preference is given in accordance with the invention to the use of ethers formed by polyaddition of ethylene oxide; that is, by insertion of one or more —$CH_2$—$CH_2$—O groups in conjunction with an acidic oxygen atom with the aid of ethylene oxide. Suitable substrates are fatty alcohols, alkyl phenols, fatty amines, fatty acids and their amides, fatty acid esters, mercaptans and imidazolines.

The products of the reactions, which are carried out industrially under pressure (from about 1 to 5 bar) at temperatures from 120 to 220° C., are linear ethers or polyethers which carry a hydroxyl group at one chain end and a functional group, which is dependent on the starting material, at the other end. The addition of a defined amount of ethylene oxide onto the substrate yields a distribution of homologous ethoxylates, the width of which can be influenced in particular through the choice of catalyst.

It is common to use alkaline catalysts, especially sodium methoxide, which lead to a wide Schulz-Flory homolog distribution, whereas alkaline earth metal salts (e.g., calcium acetate, strontium phenoxide) induce a narrowing in accordance with a Poisson distribution. Acidic catalysts (for example, antimony pentachloride) likewise bring about a distinct narrowing in the homolog distribution.

Particular preference is given in accordance with the invention to the ethoxylates, derived from fatty alcohols, of the general formula RO—$(CH_2$—$CH_2$—$O)_n$—H where n=4–10. The compounds used with preference include the fatty alcohol polyglycol ethers. In addition, alkylphenolpolyglycol ethers are also used.

In accordance with the invention, the phosphoric esters and the fatty alcohol alkoxylates are used in a mixture with one another. The proportion of the mixture is 1–20% by weight, preferably 1–10% by weight, based on the solids content of the pigment to be stabilized. The density of the mixture is 1.02 g/cm$^3$ and its viscosity is 400 mPas.

A mixture of the invention composed of phosphoric ester and fatty alcohol alkoxylate contains preferably 2–98% by weight of phosphoric ester and 2–98% by weight of fatty alcohol alkoxylate, it being possible, optionally, for customary organic solvents, and substances other than the phosphoric ester and fatty alcohol alkoxylate, acting as additives or coating components to be present. It goes without saying that the proportions of the above mixture of the invention always add up to 100% by weight. The mixture contains preferably 20–80% by weight, most preferably 40–60% by weight, for example 50% by weight, of phosphoric ester. Irrespective of this, the fatty alcohol alkoxylate can be present in proportions of preferably 20–80% by weight, most preferably 40–60% by weight, for example 50% by weight. It is preferred if the above mixture is free from the optional components.

The mixture comprising effect pigment, phosphoric ester and fatty alcohol alkoxylate is mixed with the above-described binders, coating auxiliaries, fillers and pigments. First of all the metal slurry is prepared, by introducing bronze and 50% of the solvent used in the slurry as an initial charge and then adding the stabilizer, the remaining 50% of the solvent, then the binder and, finally, the neutralizing agent. This is mixed with the metallic coating. Surprisingly it has been found that the gassing stability is significantly improved, especially when this mode of preparation is followed. Likewise, oxidation phenomena on the surface of the metal pigments are prevented. The graying of the pigment surfaces which is otherwise commonly observed, and the loss of brightness, is no longer observed with the additives of the invention.

In addition to the additives of the invention it is also possible to add further substances which serve for passivation. One example is aluminium pigments obtained by having passivated a lubricant-coated aluminum pigment in an aqueous passivating solution containing chromic acid and a water-soluble glycol ether of the general formula $R^1$(—O—$CHR^2$—$CH_2)_n$ OH ($R^1$ is a lower alkyl radical, $R^2$ is either a hydrogen atom or a lower alkyl radical, preferably a —$CH_3$ group, n is a number from 1 to 5) and/or a water-soluble glycol of the general formula HO—$(CHR^3$—$CH_2$—$O$—$)_n$ H ($R^3$ is either a hydrogen atom or a lower alkyl radical, preferably a —$CH_3$ group, n is a number from 1 to 5) at least 50° C., preferably from 60 to 90° C., with particular preference about 80° C.

In order to obtain pigments having the desired properties, it is necessary to use pigments which have a certain minimum lubricant content. The lubricant content is preferably established in the course of the production process of the aluminum pigments.

Aluminum pigments coated with fatty amines as the lubricant result in passivated pigments which have especially advantageous properties. By fatty amines are meant mixtures of long-chain, predominantly primary alkyl amines, which have been obtained, for example, from fatty acids by way of the associated nitrites by means of reduction.

As the lubricant-coated aluminum pigments it is possible to use commonly known and customary aluminum pigments consisting of aluminum or aluminum alloys, preferably of pure aluminum. Preference is given to the use of aluminum pigments in flake form. The aluminum pigments can be used in the form of the commercially available pastes without further pretreatment.

The passivation of the lubricant-coated aluminium pigments is conducted at at least 50° C., preferably from 60 to 90° C., with particular preference about 80° C., in an aqueous solution which comprises chromic acid and a water-soluble glycol ether of the general formula $R^1(-O-CHR^2-CH_2)_n$ OH ($R^1$ is a lower alkyl radical, $R^2$ is either a hydrogen atom or a lower alkyl radical, preferably a $-CH_3$ group, n is a number from 1 to 5) and/or a water-soluble glycol of the general formula $HO-(CHR^3-CH_2-O-)_n$ H ($R^3$ is either a hydrogen atom or a lower alkyl radical, preferably a $-CH_3$ group, n is a number from 1 to 5).

The aqueous solution may additionally include further additives which have a positive influence on the chromation process, such as, for example, fluorides or phosphates.

Particularly good results are obtained if the passivating solution contains chromic acid and n-butyl glycol ($CH_3-(CH_2)_3-O-CH_2-CH_2-OH$).

Both the concentration of chromic acid and the concentration of glycol or glycol ether can be varied within wide limits. The passivating solution of the invention generally contains at least 1.5, preferably from 1.5 to 4.0, with particular preference from 2.0% by weight of chromic acid and from 3 to 30, preferably from 7 to 15, with particular preference 10% by weight of water-soluble glycol ether and/or water-soluble glycol.

The passivation is preferably conducted in the freshly prepared passivating solution and is concluded in general after from 10 to 30 minutes.

Following the end of passivation, the passivated pigment obtained is separated from the passivating solution and washed thoroughly with water. The passivated aluminum pigment thus obtained can then be incorporated into water-dilutable coating compositions in accordance with methods which are common knowledge.

The water-dilutable coating compositions of the invention are preferably used as basecoat compositions for producing basecoat/clearcoat metallic coating systems. They display excellent stability with respect to hydrogen evolution, and yield metallic coating systems which are comparable in terms of their visual (flop, shade) and technological (moisture insensitivity, condensation resistance, intercoat adhesion) properties, with coating systems produced using conventional (i.e., containing exclusively organic solvents as diluents) basecoat compositions.

The applicability of the coating compositions of the invention is not restricted to the finishing of automobiles. It is also possible to coat other substrates consisting of untreated or pretreated metal, wood, plastic or the like in a one-coat or multicoat process.

The PH of the coating composition can be from 7.5 to 8.5.

The invention is illustrated below with reference to the examples.

Unstabilized bronzes were investigated with and without the addition of mixtures of phosphoric esters and fatty alcohol alkoxylates. Degressal was used as a mixture with the substances used in accordance with the invention. From the following table it is event that, in the case of use without the addition of Degressal, outgassing occurs after only one day. In contrast, the addition of Degressal had the effect of a marked reduction in the gassing instability.

| Unstabilized aluminum bronzes | | | |
|---|---|---|---|
|  | 1 day | 1 week | 3 weeks |
| Alpate 8160 | outgassed | | |
| Alpate 8160 + 2.5% Degressal SNC | | 12.2 ml | 11.8 ml |
| Alpate 8160 + 5.0% Degressal SNC | | 6.2 ml | 11.3 ml |
| Alpate 8160 + 10.0% Degressal SNC | | 10.0 ml | 11.0 ml |
| Metallux 2156 | outgassed | | |
| Metallux 2156 + 2.5% Degressal SNC | | 4.8 ml | 10.2 ml |
| Metallux 2156 + 5.0% Degressal SNC | | 1.8 ml | 9.2 ml |
| Metallux 2156 + 10.0% Degressal SNC | | 0.0 ml | 9.2 ml |
| Alpate 8160 + Sicotransrot | outgassed | | |
| Alpate 8160 + Sicotransrot + 16.6% Degressal | | 0.5 ml | 7.2 ml |
| Metallux 2156 + Sicotransrot | outgassed | | |
| Metallux 2156 + Sicotransrot + 16.6% Degressal | | 3.5 ml | 10.0 ml |

The Alpate products are aluminum pigments available through the company Toyal.

The Metallux products are alluminum pigments obtainable through the company Eckart.

Sicotransrot is an iron oxide pigment and Degrassal is a phosphoric ester with a fatty alcohol alkoxylate and both are products from BASF AG.

Independently of the specific examples and embodiments described above, the following is noted in addition.

In the context of the invention, the expression metal pigments defines all kinds of pigments which have surfaces which in whole or in part contain metal, these metal-containing surfaces exhibiting a tendency to form gas, especially hydrogen, on contact with water and at pH levels typical of coating compositions. The surfaces in question comprise, in the majority of cases, metal present in elemental form, or metal compound structures which have not been adequately passivated. Metal pigments can be effect pigments, i.e., pigments which in addition to or instead of a purely coloring effect induce optical effects which differ from this. Metal pigments of this kind are also called metallic or metal effect pigments. Alternatively, however, metal pigments may have an exclusively coloring effect or may be transparent.

What is claimed is:

1. A water-dilutable coating composition comprising at least one binder, at least one inorganic pigment other than a metal pigment, at least one metal pigment, at least one phosphoric ester, and at least one fatty alcohol alkoxylate, and optionally, a compound selected from the group consisting of organic pigments, solvents, fillers, plasticizers, stabilizers, wetting agents, dispersing auxiliaries, leveling agents, defoamers, catalysts and mixtures thereof; wherein the at least one metal pigment has been passivated.

2. A water-dilutable coating composition as claimed in claim 1, obtained by adding a mixture comprising the at least one inorganic pigment other than a metal pigment, the at least one metal pigment, the at least one phosphoric ester, and the at least one fatty alcohol alkoxylate to the at least one binder.

3. A water-dilutable coating composition as claimed in claim 1 comprising metal phosphoric acid esters.

4. A water-dilutable coating composition as claimed in claim 3, comprising aluminum phosphoric acid esters.

5. A water-dilutable coating composition as claimed in claim 1, wherein the proportion of phosphoric ester and of fatty alcohol alkoxylate together is from 1 to 20% by weight based on the solids content of the pigment to be stabilized in the mixture.

6. A water-dilutable coating composition as claimed in claim 5, wherein the proportion of phosphoric ester and of fatty alcohol alkoxylate together is 1–10% by weight.

7. A water-dilutable coating composition as claimed in claim 1 wherein the at least one metal pigment comprises at least one metal powder as an effect pigment.

8. A water-dilutable coating composition as claimed in claim 1, wherein the at least one metal pigment comprises as an effect pigment a compound selected from the group consisting of copper alloys, aluminum, steel, pearl lustre pigments, and mixtures thereof.

9. A water-dilutable coating composition as claimed in claim 1 wherein said fatty alcohol alkoxylates are ethoxylates.

10. A water-dilutable coating composition as claimed in claim 1, wherein the at least one phosphoric ester, and the at least one fatty alcohol alkoxylate are added to the coating composition as a mixture, and wherein the mixture has a density of 1.02 g/cm$^3$ and a viscosity of 400 mPas.

11. A water-dilutable coating composition as claimed in claim 1, wherein the pH is from 7.5 to 8.5.

12. A process for preparing a water-dilutable coating composition as claimed in claim 1 comprising preparing a dispersion comprising the at least one metal pigment, the at least one inorganic pigment other than a metal pigment, the phosphoric ester, and the fatty alcohol alkoxylate and then mixing the dispersion with the binder and optionally the compound selected from the group consisting of organic pigments, solvents, fillers, plasticizers, stabilizers, wetting agents, dispersing auxiliaries, levelling agents, defoamers, catalysts, and mixtures thereof.

13. A water-dilutable coating composition as claimed in claim 1, wherein the coating composition can be applied to a metal substrate.

* * * * *